United States Patent
Pidcock et al.

(10) Patent No.: US 9,518,737 B2
(45) Date of Patent: Dec. 13, 2016

(54) COMBUSTION CHAMBER WITH COOLING PASSAGE IN FASTENER ARRANGEMENT JOINING INNER AND OUTER WALLS

(71) Applicant: ROLLS-ROYCE PLC, London (GB)

(72) Inventors: Anthony Pidcock, Derby (GB); Paul Ian Chandler, Birmingham (GB)

(73) Assignee: ROLLS-ROYCE PLC, London (GB)

( * ) Notice: Subject to any disclaimer, the term of this patent is extended or adjusted under 35 U.S.C. 154(b) by 457 days.

(21) Appl. No.: 14/097,791

(22) Filed: Dec. 5, 2013

(65) Prior Publication Data

US 2014/0190166 A1    Jul. 10, 2014

(30) Foreign Application Priority Data

Dec. 12, 2012   (GB) .................................. 1222311.1

(51) Int. Cl.
*F23R 3/00* (2006.01)
*F23R 3/60* (2006.01)
(Continued)

(52) U.S. Cl.
CPC ................. *F23R 3/002* (2013.01); *F23R 3/60* (2013.01); *F05D 2260/31* (2013.01); *F16B 37/00* (2013.01);
(Continued)

(58) Field of Classification Search
CPC ............... F23R 3/60; F23R 3/002; F23R 3/06; F23R 2900/03041–2900/03045; F23M 5/08; F23M 5/085; F05D 2260/22141; F05D 2260/31; F05D 2260/201; F16B 43/003; F16B 43/02; F16B 21/09; F01D 25/28; F02C 7/24
(Continued)

(56) References Cited

U.S. PATENT DOCUMENTS 3,408,812 A * 11/1968 Stenger ..................... F23R 3/08
60/757
4,748,806 A *  6/1988 Drobny ..................... F02K 1/80
403/259
(Continued)

FOREIGN PATENT DOCUMENTS

DE       10154285 A1   5/2003
EP      2 295 865 A2   3/2011
(Continued)

OTHER PUBLICATIONS

Search Report issued in European Patent Application No. 13 00 5694 dated Feb. 13, 2014.
(Continued)

*Primary Examiner* — Gerald L Sung
*Assistant Examiner* — Alain Chau
(74) *Attorney, Agent, or Firm* — Oliff PLC

(57) ABSTRACT

A combustion chamber comprises an outer wall and an inner wall spaced from the outer wall. The outer wall has at least one mounting aperture extending there-through and the inner wall has threaded studs extending there-from. The threaded studs extend through the mounting apertures in the outer wall. Cooperating nuts locate on the studs and washers are positioned between the outer wall and the cooperating nuts. Each washer has a rim and a bore. The washers have one or more passages extending there-through from the rim to the bore of the washer to provide a flow of coolant through the passages in the washers, the mounting apertures in the outer wall and around the threaded studs to cool the threaded studs to increase the working life of the inner wall. Other cooling arrangements for the threaded studs are disclosed.

22 Claims, 7 Drawing Sheets

(51) Int. Cl.
*F16B 37/00* (2006.01)
*F16B 43/00* (2006.01)

(52) U.S. Cl.
CPC ...... *F16B 43/00* (2013.01); *F23R 2900/03041* (2013.01); *F23R 2900/03042* (2013.01); *F23R 2900/03044* (2013.01)

(58) Field of Classification Search
USPC .......................................................... 60/755
See application file for complete search history.

(56) References Cited

U.S. PATENT DOCUMENTS

| | | | | |
|---|---|---|---|---|
| 4,820,097 | A * | 4/1989 | Maeda | F02K 1/80 165/134.1 |
| 4,944,151 | A * | 7/1990 | Hovnanian | F23R 3/002 60/752 |
| 5,435,139 | A | 7/1995 | Pidcock et al. | |
| 6,718,774 | B2 * | 4/2004 | Razzell | F01D 25/243 60/753 |
| 6,857,275 | B2 * | 2/2005 | Pidcock | F23R 3/002 60/752 |
| 2002/0108598 | A1 * | 8/2002 | Antonevich | F02F 1/24 123/195 R |
| 2003/0145604 | A1 * | 8/2003 | Pidcock | F23R 3/002 60/796 |
| 2004/0093872 | A1 | 5/2004 | Tiemann | |
| 2011/0011095 | A1 * | 1/2011 | Ladd | F23R 3/002 60/796 |
| 2011/0030378 | A1 * | 2/2011 | Carlisle | F23R 3/002 60/753 |
| 2011/0123323 | A1 * | 5/2011 | Ruberte Sanchez | F01D 25/00 415/200 |
| 2012/0144835 | A1 * | 6/2012 | Taylor | F23R 3/002 60/755 |

FOREIGN PATENT DOCUMENTS

| | | |
|---|---|---|
| GB | 2 380 236 A | 4/2003 |
| WO | WO 2005/019731 A1 | 3/2005 |

OTHER PUBLICATIONS

Search Report issued in British Patent Application No. GB1222311.1 dated Jun. 12, 2013.

* cited by examiner

COMBUSTION CHAMBER WITH COOLING PASSAGE IN FASTENER ARRANGEMENT JOINING INNER AND OUTER WALLS

The present invention relates to a combustion chamber and in particular to a gas turbine engine combustion chamber.

Gas turbine engine combustion chambers experience extremely high temperatures in operation and the walls of the combustion chambers are generally cooled using a coolant.

It is known to provide combustion chambers comprising an inner wall and an outer wall or combustion chamber comprising segments, or tiles, and in particular the inner wall comprises a plurality of segments, or tiles, supported on the outer wall. The tiles consist of high temperature resistant material, e.g. a nickel base superalloy. The tiles are spaced from the inner surface of the outer wall to provide a passage for coolant. The outer wall of the combustion chamber may have apertures extending there-through to provide impingement cooling of the outer surfaces of the tiles. The tiles may have pedestals projecting from their outer surfaces to provide convection cooling of the tiles. The tiles may have apertures extending there-through to provide film cooling, or effusion cooling, of the inner surfaces of the tiles.

Each tile is generally mounted on the outer wall using studs which are integral with the tile and which extend through mounting apertures in the outer wall. The studs are generally threaded and washers and nuts are fastened onto the studs.

Our U.S. Pat. No. 5,435,139 discloses an outer wall of a combustion chamber with apertures extending there-through to provide impingement cooling of the outer surfaces of the tiles and apertures extending through the tiles to provide film cooling, or effusion cooling, of the inner surfaces of the tiles. U.S. Pat. No. 5,435,139 uses threaded studs and nuts to mount the tiles on the outer wall.

Our U.S. Pat. No. 6,857,275 discloses an outer wall of a combustion chamber with apertures extending there-through to provide impingement cooling of the outer surfaces of the tiles, pedestals projecting from the outer surfaces of the tiles to provide convection cooling of the tiles and apertures extending through the tiles to provide film cooling, or effusion cooling, of the inner surfaces of the tiles. U.S. Pat. No. 6,857,275 uses threaded studs and nuts to mount the tiles on the outer wall.

U.S. Pat. No. 6,857,275 discloses the use of apertures extending through or near the base region of the threaded studs on the tiles. These apertures are intended to produce film cooling of the inner surface of the tiles in the vicinity of the base region of the studs to reduce the amount of heat transferred to the tiles by convection and the apertures are also intended to remove heat by convection from the vicinity of the base region of the studs. These apertures are located in highly stressed areas around the base fillet of the studs where the studs blend into the remainder of the tiles. In order to reduce these stresses either smaller diameter effusion apertures or larger studs are required to provide mechanical integrity. However, both of these options reduce the cooling of the base regions of the studs.

US2011/0011095A1 discloses an outer wall of a combustion chamber with apertures extending there-through to provide impingement cooling of the outer surfaces of the tiles, pedestals projecting from the outer surfaces of the tiles to provide convection cooling of the tiles and apertures extending through the tiles to provide film cooling, or effusion cooling, of the inner surfaces of the tiles. US2011/0011095A1 uses threaded studs and nuts to mount the tiles on the outer wall.

US2011/0011095A1 discloses the use of washers located on the studs and between the nuts and the outer wall of the combustion chamber. The washers are provided with apertures which extend between the surfaces which abut the outer surfaces of the combustion chamber and the surfaces of the nuts. The apertures direct a cooling flow to the base region of the studs to increase convection cooling of the outer surface of the tiles. These apertures only cool a circumferential portion of each stud directly aligned with the apertures and thus the apertures do not provide uniform cooling around the circumference of the studs, which may lead to high local thermal and/or stress gradients at the base regions of the studs. Furthermore, the apertures must be positioned beyond the rims of the nuts and this limits the ability of the apertures to direct a cooling flow onto the base regions of the studs. Additionally, the cooling flow through the apertures may be compromised by the location of the studs and nuts relative to the apertures particularly if the studs and nuts are directly upstream of the apertures.

In order to maximise the operating life of the tiles the studs must be adequately cooled by a cooling film on the inner surface of the tiles and by cooling flow on the outer surface of the tiles.

The present invention seeks to provide a novel combustion chamber which reduces, preferably overcomes, the abovementioned problem.

Accordingly the present invention provides a combustion chamber comprising an outer wall and an inner wall spaced from the outer wall, the outer wall having at least one mounting aperture extending there-through, the inner wall having at least one fastener extending there-from, the at least one fastener on the inner wall extending through a corresponding mounting aperture in the outer wall, a cooperating fastener locating on the at least one fastener extending through the corresponding mounting aperture and a washer positioned on the at least one fastener between the outer wall and the cooperating fastener, the washer having a first surface abutting an outer surface of the outer wall and a second surface abutting a surface of the cooperating fastener, the washer having a rim and a bore, the washer having at least one passage extending there-through from the rim to the bore and/or the washer having at least one groove extending from the rim towards the bore on the first surface and/or the washer having at least one groove extending from the bore towards the rim on the second surface and/or the surface of the cooperating fastener abutting the second surface of the washer having at least one groove extending towards the bore of the washer whereby a flow of coolant is provided to flow through the mounting aperture and around the at least one fastener.

The washer may be circular or may be oval.

Preferably the washer having a sleeve, the sleeve extending into the mounting aperture in the outer wall and the sleeve being arranged around the fastener to guide the flow of coolant around the fastener.

Preferably the fastener having a plurality of ribs extending laterally there-from and the ribs being arranged at an end of the fastener adjacent to the inner wall, the ribs extending from the inner wall towards the mounting aperture and the ribs being spaced from the outer wall.

Preferably the fastener having a plurality of ribs extending laterally there-from and the ribs being arranged at an end of the fastener adjacent to the inner wall, the ribs extending from the inner wall at least partially into the mounting aperture and the ribs being spaced from the outer wall.

Preferably the fastener having a plurality of ribs extending laterally therefrom and the ribs being arranged at an end of the fastener adjacent to the inner wall, the ribs extending from the inner wall at least partially into the mounting aperture and the ribs being spaced from the outer wall, the washer having a sleeve spaced from the bore, the sleeve extending into the mounting aperture in the outer wall and the sleeve being arranged around the fastener to guide the flow of coolant around the fastener and over the ribs.

The at least one groove on the second surface of the washer being defined by an indent and the bore in the washer being key-hole in shape. The key hole shaped bore in the washer has a cut out extending into the indent.

A second washer may be positioned between the inner wall and the outer wall and the washer being arranged around the fastener. The second washer may be clamped between the outer wall and pedestals on the inner wall.

The fastener may have a plurality of ribs extending laterally there-from and the ribs being arranged at an end of the fastener adjacent to the inner wall, the ribs extending from the inner wall towards the mounting aperture and the ribs being spaced from the outer wall, a second washer may be positioned between the inner wall and the outer wall and the washer being arranged around the fastener, the second washer being arranged around the fastener to guide the flow of coolant around the fastener and over the ribs.

The fastener may have a plurality of projections extending laterally there-from and the projections being arranged at an end of the fastener adjacent to the inner wall. The projections may be ribs or pedestals, each rib extending laterally and longitudinally with respect to the fastener, each pedestal extending laterally with respect to the fastener, the pedestals being arranged in rows and the rows of pedestals being spaced apart longitudinally with respect to the fastener.

The inner wall may comprise a plurality of segments, or tiles.

The projections, ribs or pedestals, may be integral with the fastener. The fastener may be integral with the segments, or tiles. The segments, or tiles, may be formed by casting molten metal or may be formed by selective laser sintering of powder metal.

Preferably the outer wall having a plurality of impingement apertures extending there-through and the inner wall having a plurality of effusion apertures extending therethrough.

The inner wall may be a radially inner wall and the outer wall may be a radially outer wall of an outer wall of an annular combustion chamber. The inner wall may be a radially outer wall and the outer wall may be radially inner wall of an inner wall of an annular combustion chamber. The inner wall may be a radially inner wall and the outer wall may be a radially outer wall of a tubular combustion chamber. The inner wall may be a downstream wall and the outer wall may be an upstream wall of an upstream end wall of an annular combustion chamber or a tubular combustion chamber.

BRIEF DESCRIPTION OF THE DRAWINGS

The present invention will be more fully described by way of example with reference to the accompanying drawings, in which:—

Figure 1:
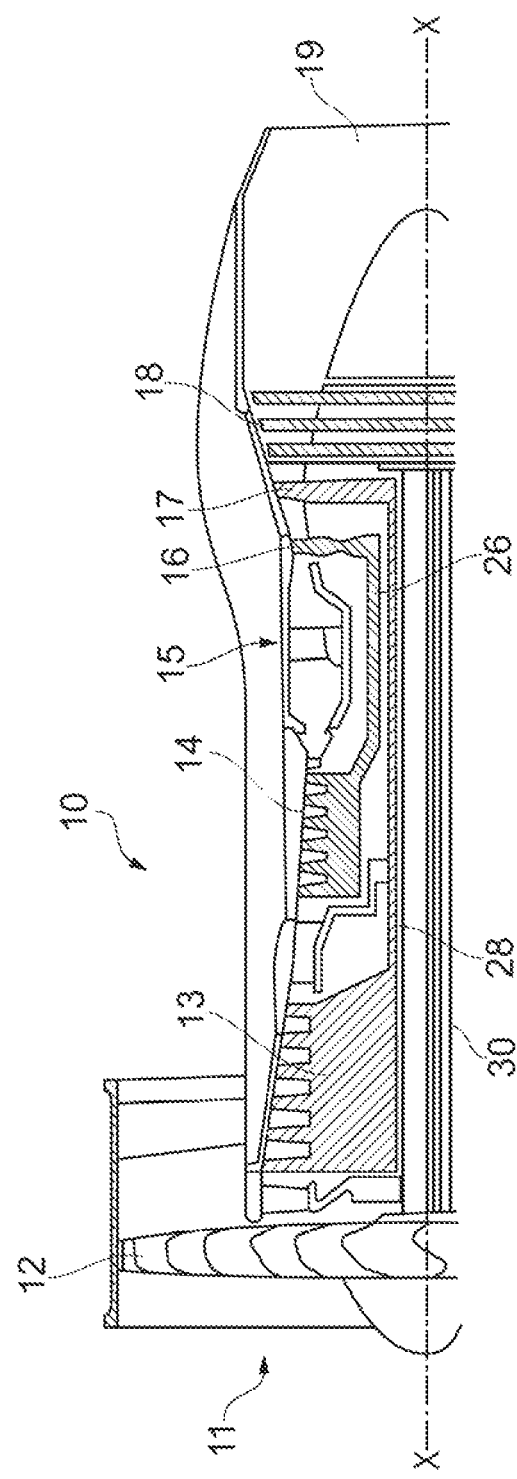
FIG. 1 is partially cut away view of a turbofan gas turbine engine having a combustion chamber according to the present invention.

A turbofan gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Figure 2:
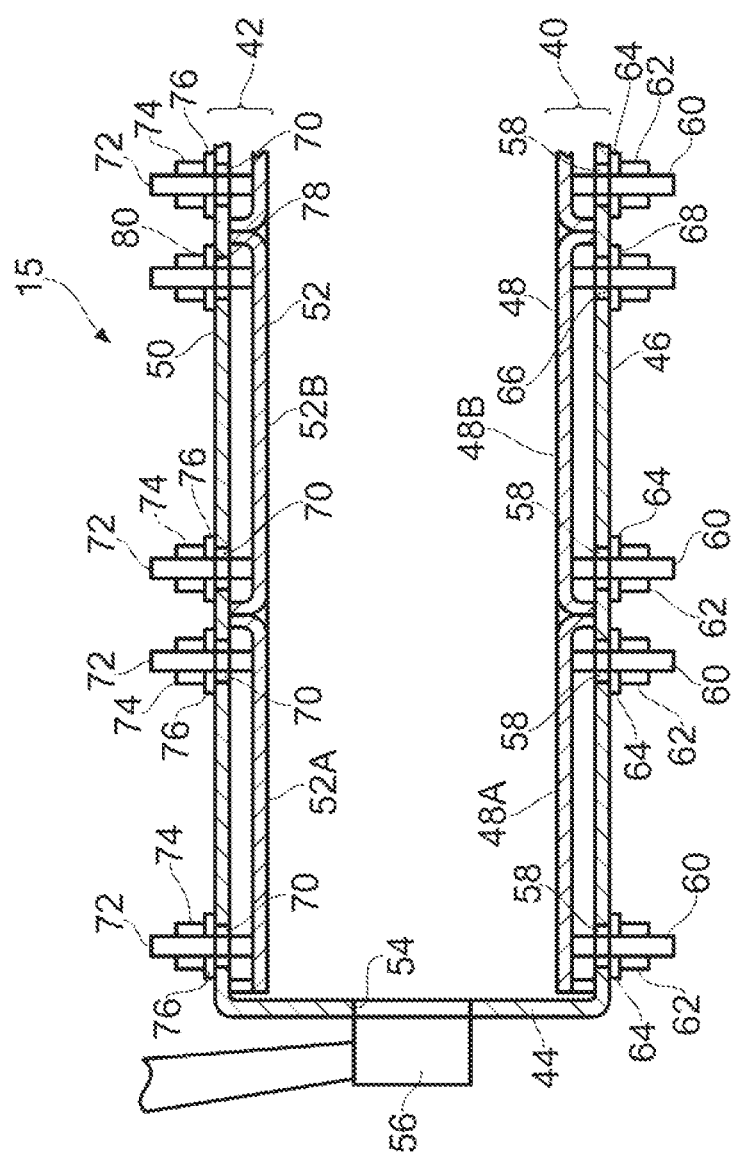
FIG. 2 is an enlarged cross-sectional view of a combustion chamber according to the present invention.

The combustion chamber 15, as shown more clearly in FIG. 2, is an annular combustion chamber and comprises a radially inner annular wall structure 40, a radially outer annular wall structure 42 and an upstream end wall structure 44. The radially inner annular wall structure 40 comprises a first annular wall 46 and a second annular wall 48. The radially outer annular wall structure 42 comprises a third annular wall 50 and a fourth annular wall 52. The second annular wall 48 is spaced radially from and is arranged radially around the first annular wall 46 and the first annular wall 46 supports the second annular wall 48. The fourth annular wall 52 is spaced radially from and is arranged radially within the third annular wall 50 and the third annular wall 50 supports the fourth annular wall 52. The upstream end of the first annular wall 46 is secured to the upstream end wall structure 44 and the upstream end of the third annular wall 50 is secured to the upstream end wall structure 44. The upstream end wall structure 44 has a plurality of circumferentially spaced apertures 54 and each aperture 54 has a respective one of a plurality of fuel injectors 56 located therein. The fuel injectors 56 are arranged to supply fuel into the annular combustion chamber 15 during operation of the gas turbine engine 10.

The first annular wall 46 has a plurality of mounting apertures 58 extending there-though and the second annular wall 48 has a plurality of fasteners 60 extending radially there-from. Each fastener 60 on the second annular wall 48 extends radially through a corresponding mounting aperture 58 in the first annular wall 46. A cooperating fastener 62 locates on each of the fasteners 60 extending through the mounting apertures 58 in the first annular wall 46. A washer 64 is positioned between each fastener 60 on the second annular wall 48 and the cooperating fastener 62. Each washer 64 has a first surface 66 abutting an outer surface of the first annular wall 46 and a second surface 68 abutting a surface of the cooperating fastener 62. The second annular wall 48 comprises a plurality of segments, or tiles, 48A and 48B and the segments, or tiles, 48A and 48B are arranged circumferentially and axially around the first annular wall 46. The axially extending edges of adjacent segments, or tiles, 48A and/or 48B may abut each other or may overlap each other and the circumferentially extending ends of adjacent segments, or tiles, 48A and 48B may abut each other or may overlap each other.

Similarly, the third annular wall 50 has a plurality of mounting apertures 70 extending there-though and the fourth annular wall 52 has a plurality of fasteners 72 extending radially there-from. Each fastener 72 on the fourth annular wall 52 extends radially through a corresponding mounting aperture 70 in the third annular wall 50. A cooperating fastener 74 locates on each of the fasteners 72 extending through the mounting apertures 70 in the third annular wall 50. A washer 76 is positioned between each fastener 72 on the fourth annular wall 52 and the cooperating fastener 74. Each washer 76 has a first surface 78 abutting an outer surface of the third annular wall 50 and a second surface 80 abutting a surface of the cooperating fastener 74. The fourth annular wall 52 comprises a plurality of segments, or tiles, 52A and 52B and the segments, or tiles, 52A and 52B are arranged circumferentially and axially adjacent to each other to define the fourth annular wall 52. The axially extending edges of adjacent segments, or tiles, 52A and/or 52B may abut each other or may overlap each other and the circumferentially extending ends of adjacent segments, or tiles, 52A and 52B may abut each other or may overlap each other.

The fasteners 60 and 72 on the second and fourth annular walls 48 and 52 are threaded studs which are cast integrally with the segments, or tiles, 48A, 48B, 52A and 52B or may be secured to the segments, or tiles, 48A, 48B, 52A and 52B by welding, brazing etc. The cooperating fasteners 62 and 74 are nuts.

Figure 3:
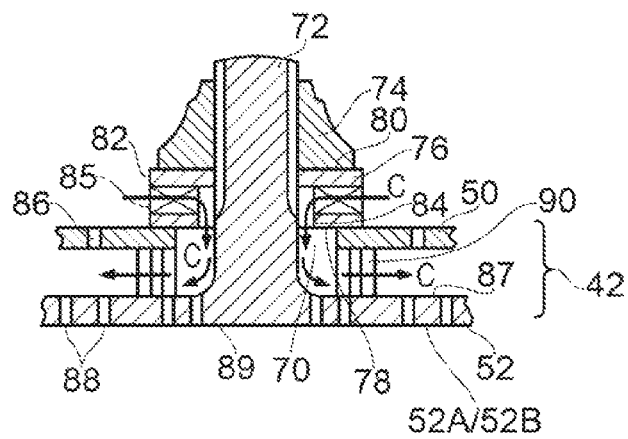
FIG. 3 is a further enlarged cross-sectional view of a first embodiment of a combustion chamber according to the present invention.

FIG. 3 is an enlarged cross-sectional view through a first embodiment of an arrangement to mount a segment, or tile, 52A, 52B of the fourth annular wall 52 onto the third annular wall 50 of the radially outer annular wall structure 42. The, or each, washer 76 has a rim 82 and a bore 84 and one or more apertures, or passages, 85 extending radially through the washer 76 from the rim 82 to the bore 84. The third annular wall 50 is provided with a plurality of apertures 86 extending there-through to provide a flow of coolant through the third annular wall 50 to impinge upon and cool the radially outer surface 87 of the fourth annular wall 52. The segments, or tiles, 52A and 52B of the fourth annular wall 52 are provided with a plurality of apertures 88 extending there-through to provide a flow of coolant through the fourth annular wall 52 to provide effusion cooling and/or film cooling of the radially inner surface 89 of the fourth annular wall 52. The segments, or tiles, 52A and 52B have pedestals 90 extending radially outwardly there-from to space the fourth annular wall 52 from the third annular wall 50. Some of these pedestals 90 are located immediately around the mounting apertures 70 in the third annular wall 50. In operation the apertures, or passages, 85 in each washer 76 provides a flow of coolant C from the outside of the third annular wall 50 through the apertures, or passages, 85 from the rim 82 of the washer 76 to the bore 84 of the washer 76. The flow of coolant C then turns to flow radially with respect to the axis of the annular combustion chamber 15 through the respective mounting aperture 70 in the third annular wall 50. The flow of coolant C flows radially with respect to the axis of the annular combustion chamber 15 along the respective fastener 72 towards the base of the respective fastener 72 where the fastener 72 blends into the segment, or tile, 52A, 52B. The flow of coolant C completely surrounds the full circumference of the fastener 72. The flow of coolant C turns to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal.

Figure 4:
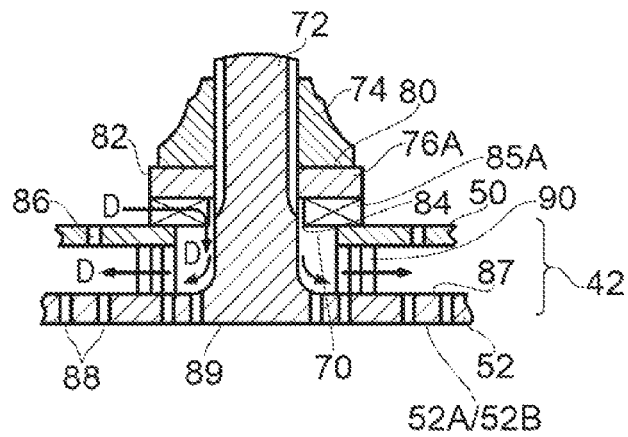
FIG. 4 is a further enlarged cross-sectional view of a second embodiment of a combustion chamber according to the present invention.

FIG. 4 is an enlarged cross-sectional view through a second embodiment of an arrangement to mount a segment, or tile, 52A, 52B of the fourth annular wall 52 onto the third annular wall 50 of the radially outer annular wall structure 42. The arrangement in FIG. 4 is similar to the arrangement shown in FIG. 3 and like parts are denoted by like numbers. The, or each, washer 76A has a rim 82 and a bore 84 and one or more grooves 85A extending radially from the bore 84 towards the rim 82 on the first surface 78 of the washer 76A which abuts the outer surface of the third annular wall 50. It is to be noted that the grooves 85A in FIG. 4 extend radially all the way from the bore 84 to the rim 82 on the first surface 78 of the washer 76. The washer 76A may be circular, or disc shaped, with the bore 84 arranged to extend coaxially through the washer 76A or the washer 76A may be oval with the bore 84 arranged to extend through the washer 76A. In operation the grooves 85A in each washer 76A provides a flow of coolant D from the outside of the third annular wall 50 through the grooves, or passages, 85A from the rim 82 of the washer 76A to the bore 84 of the washer 76A. The flow of coolant D then turns to flow radially with respect to the axis of the annular combustion chamber 15 through the respective mounting aperture 70 in the third annular wall 50. The flow of coolant D flows radially with respect to the axis of the annular combustion chamber 15 along the respective fastener 72 towards the base of the respective fastener 72 where the fastener 72 blends into the segment, or tile, 52A, 52B. The flow of coolant D completely surrounds the full circumference of the fastener 72. The flow of coolant D turns to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal. In FIG. 4 in the case of a circular washer 76A and a circular mounting aperture 70 the radius of the bore 84 of the washer 76A is less than the radius of the mounting aperture 70 and the grooves 85A on the first surface 78 of the washer 76A extend from the rim 82 of the washer 76A towards the bore 84 of the washer 76A to a radius less than the radius of the mounting aperture 70 to enable the coolant flow D through the mounting aperture 70.

Figure 6:
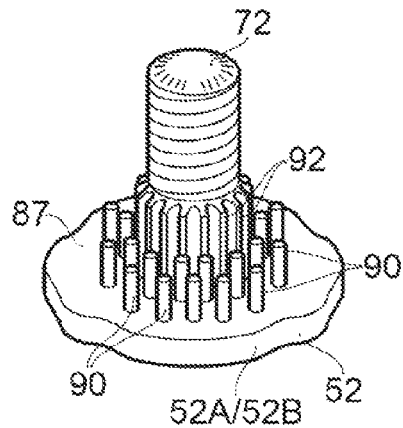
FIG. 6 is a perspective view of the third embodiment of the combustion chamber showing the stud.
Figure 5:
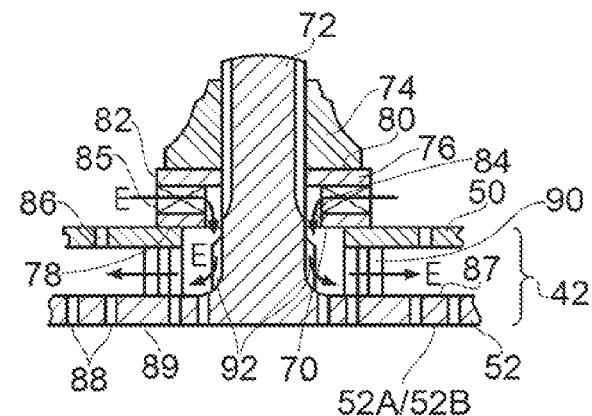
FIG. 5 is a further enlarged cross-sectional view of a third embodiment of a combustion chamber according to the present invention.

FIGS. 5 and 6 are an enlarged cross-sectional view through and a perspective view of a third embodiment of an arrangement to mount a segment, or tile, 52A, 52B of the fourth annular wall 52 onto the third annular wall 50 of the radially outer annular wall structure 42. The arrangement in FIGS. 5 and 6 is similar to the arrangement shown in FIG. 3 and like parts are denoted by like numbers. The, or each, washer 76 has a rim 82 and a bore 84 and one or more apertures, or passages, 85 extending radially through the washer 76 from the rim 82 to the bore 84. The washer 76 is circular, or disc shaped, with the bore 84 arranged to extend coaxially through the washer 76. In addition the fastener 72 has a plurality of ribs 92 extending laterally, radially with respect to the axis of the fastener 72, from the fastener 72 and the ribs 92 are arranged at an end of the fastener 72 adjacent to the segment, or tile, 52A or 52B of the fourth annular wall 52 where the fastener 72 blends into the segment, or tile, 52A or 52B. The ribs 92 extend from the segment, or tile, 52A or 52B of the fourth annular wall 52, radially with respect to the axis of the annular combustion chamber 15, towards the mounting aperture 70 in the third annular wall 50 and the ribs 92 are spaced from the third annular wall 50. The ribs 92 are integral with the fastener 72. In operation the apertures, or passages, 85 in each washer 76 provides a flow of coolant E from the outside of the third annular wall 50 through the apertures, or passages, 85 from the rim 82 of the washer 76 to the bore 84 of the washer 76. The flow of coolant E then turns to flow radially with respect to the axis of the annular combustion chamber 15 through the respective mounting aperture 70 in the third annular wall 50. The flow of coolant E flows radially with respect to the axis of the annular combustion chamber 15 along the respective fastener 72 towards the base of the respective fastener 72 where the fastener 72 blends into the segment, or tile, 52A, 52B. The flow of coolant E completely surrounds the full circumference of the fastener 72. The flow of coolant E also flows over the ribs 92 and between the ribs 92 on the base of the fastener 72 to provide greater cooling of the base of the fastener 72. The ribs 92 conduct heat away from the base of the fastener 72 and the flow of coolant E removes heat from the ribs 92 by convection. The flow of coolant E turns to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal. The ribs 92 increase the surface area of the fastener 72 and for example the ribs 92 double the surface area of the fastener 72 at the base of the fastener 72 and increase the level of heat removal from the base of the fastener 72. The pedestals 90 also conduct heat away from the segment, or tile, 52A or 52B from the region of the segment, or tile, 52A or 52B in the vicinity of the fastener 72 and the flow of coolant E removes heat from the pedestals 90 by convection.

Figure 7:
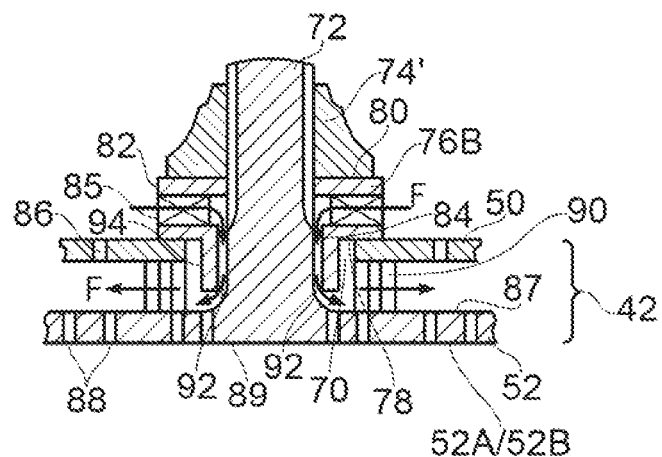
FIG. 7 is a further enlarged cross-sectional view of a fourth embodiment of a combustion chamber according to the present invention.

A fourth embodiment of an arrangement to mount a segment, or tile, 52A, 52B of the fourth annular wall 52 onto the third annular wall 50 of the radially outer annular wall structure 42 is shown in FIG. 7. The arrangement in FIG. 7 is similar to the arrangement shown in FIG. 5 and like parts are denoted by like numbers. The, or each, washer 76B has a rim 82 and a bore 84 and one or more apertures, or passages, 85 extending radially through the washer 76B from the rim 82 to the bore 84. The washer 76B is circular, or disc shaped, with the bore 84 arranged to extend coaxially through the washer 76B. The fastener 72 has a plurality of ribs 92 extending laterally, radially, there-from and the ribs 92 are arranged at an end of the fastener 72 adjacent to the segment, or tile, 52A or 52B of the fourth annular wall 52 where the fastener 72 blends into the segment, or tile, 52A or 52B. In addition the washer 76B has a sleeve 94 and the sleeve 94 is arranged coaxially with the bore 84. The inner surface of the sleeve 94 is at the same or a greater diameter than the diameter of the bore 84. The sleeve 94 of the washer 76B extends radially with respect to the axis of the annular combustion chamber 15 into the mounting aperture 70 in the third annular wall 50 and the sleeve 94 is arranged around the fastener 72. The sleeve 94 of the washer 76B is also arranged around the ribs 92 at the base of the fastener 72 and the sleeve 94 acts as guide for the flow of coolant F over the ribs 92 of the fastener 72 and prevents the flow of coolant F diffusing away from the base of the fastener 72 into the cavity between the third annular wall 50 and the second annular wall 52. This embodiment works in a similar manner to that in FIGS. 5 and 6 but as mentioned the sleeve 94 of the washer 76B prevents the flow of coolant F diffusing away from the base of the fastener 72. The sleeve 94 maintains a higher velocity for the flow of coolant F over the base of the fastener 72 and in combination with the ribs 92 on the base of the fastener 72 the heat removal is about four times that of the arrangement shown in FIG. 3 and the heat removal is better than that of the arrangement shown in FIGS. 5 and 6. The sleeve 94 may be cylindrical such that the cross-sectional area between the sleeve and the base of the fastener 72 is constant along the length of the sleeve 94. Alternatively the sleeve 94 may taper radially inwardly such that the cross-sectional area between the sleeve 94 and the base of the fastener 72 decreases in a direction towards the segment, or tile, 52A or 52B to accelerate the flow of coolant F through the sleeve 94.

Another possible embodiment of the present invention is to provide the embodiment of FIG. 7, but without the ribs on the base of the fastener. However, this would provide better heat removal than the embodiment of FIG. 3 but the heat removal would be less than that of the embodiment in FIG. 7.

Figure 8:
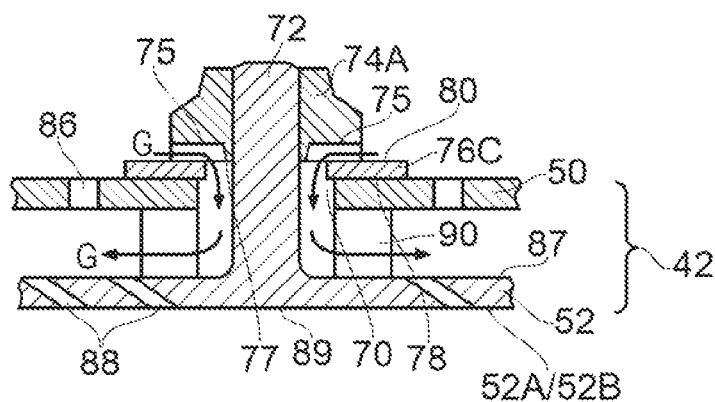
FIG. 8 is a further enlarged cross-sectional view of a fifth embodiment of a combustion chamber according to the present invention.

A fifth embodiment of an arrangement to mount a segment, or tile, 52A, 52B of the fourth annular wall 52 onto the third annular wall 50 of the radially outer annular wall structure 42 is shown in FIG. 8. The arrangement in FIG. 8 is similar to the arrangement shown in FIG. 3 and like parts are denoted by like numbers. The, or each, washer 76C has a rim 82 and a bore 84 but is a conventional washer and does not have any apertures, or passages, extending radially through the washer 76 from the rim 82 to the bore 84. In this embodiment the nut 74A has one or more grooves 75 extending radially from the rim, or periphery, of the nut 74A towards the bore of the nut 74A on the surface 77 of the nut 74A which abuts the second surface 80 of the washer 76. The washer 76C is circular, or disc shaped, with the bore 84 arranged to extend coaxially through the washer 76C. In operation the grooves 75 on the surface 77 of each nut 74 provides a flow of coolant G from the outside of the third annular wall 50 through the grooves 75 from the rim, or periphery, of the nut 74A towards the bore of the nut 74A. The flow of coolant G then turns to flow radially with respect to the axis of the annular combustion chamber 15 through the bore 84 in the respective washer 76C and then through the respective mounting aperture 70 in the third annular wall 50. The flow of coolant G flows radially with respect to the axis of the annular combustion chamber 15 along the respective fastener 72 towards the base of the respective fastener 72 where the fastener 72 blends into the segment, or tile, 52A, 52B. The flow of coolant G completely surrounds the full circumference of the fastener 72. The flow of coolant G turns to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal. The washer 76 acts as a guide to focus the flow of coolant. This arrangement also shows apertures 88 in the segments, or tiles, 52A, 52B of the fourth annular wall 52 which are angled in a downstream direction.

Figures 21, 22:
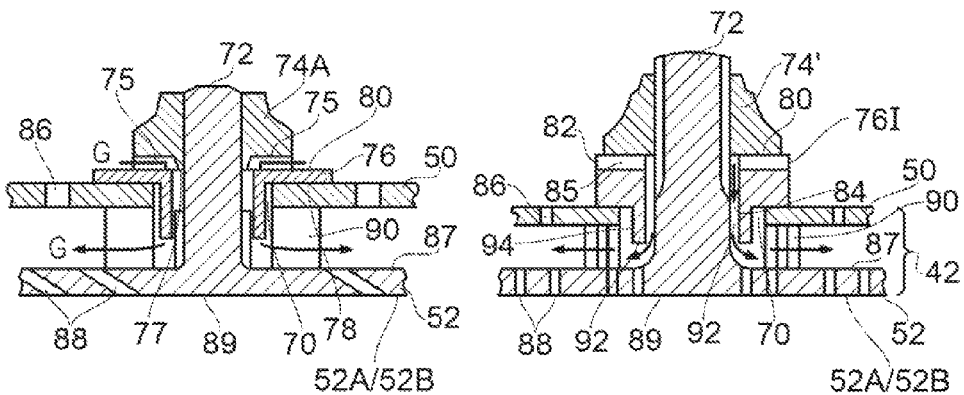
FIG. 21 is a further enlarged cross-sectional view of a further embodiment of a combustion chamber according to the present invention.
FIG. 22 is further enlarged cross-sectional view of another embodiment of a combustion chamber according to the present invention.

Another possible embodiment of the present invention is to provide the embodiment of FIG. 8, but with the ribs on the base of the fastener as shown in FIGS. 5 and 6. A further possible embodiment of the present invention, as shown in FIG. 21, is to provide the embodiment of FIG. 8, but with the ribs on the base of the fastener and with a sleeve on the washer as shown in FIG. 7 and again in this embodiment the sleeve acts as a guide to focus the flow of coolant and to prevent the flow of coolant diffusing into the cavity between the third annular wall and the fourth annular wall.

Figures 9, 10:
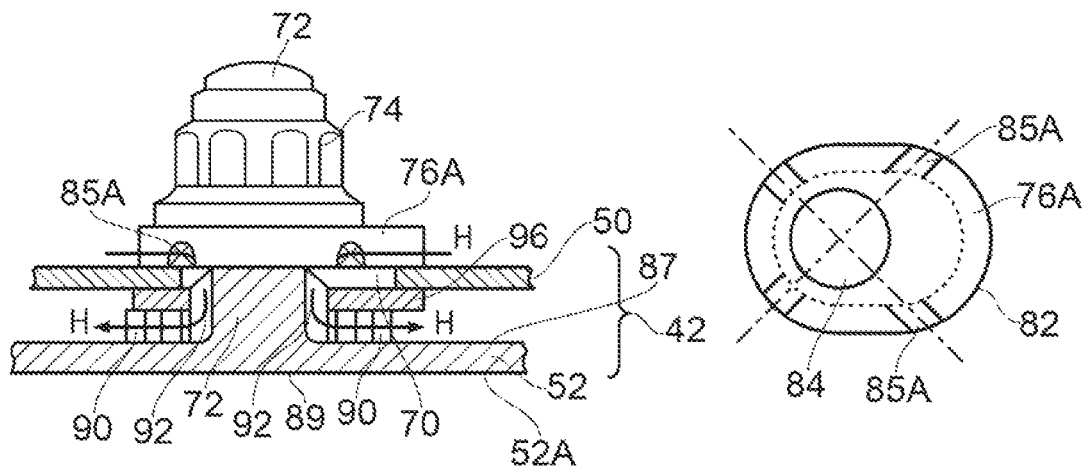
FIG. 9 is a further enlarged cross-sectional view of a sixth embodiment of a combustion chamber according to the present invention.
FIG. 10 is a plan view of the washer shown in FIG. 9.

A sixth embodiment of an arrangement to mount a segment, or tile, 52A, 52B of the fourth annular wall 52 onto the third annular wall 50 of the radially outer annular wall structure 42 is shown in FIGS. 9 and 10. This embodiment is similar to the embodiment shown in FIG. 4 and like parts are denoted by like numbers. The, or each, washer 76A has a rim 82 and a bore 84 and one or more grooves 85A extending radially from the bore 84 towards the rim 82 on the first surface 78 of the washer 76A which abuts the outer surface of the third annular wall 50. It is to be noted that the washer is oval and the grooves 85A extend from the bore 84 to the rim 82 on the first surface 78 of the washer 76. The fastener 72 has a plurality of ribs 92 extending laterally, radially, there-from and the ribs 92 are arranged at an end of the fastener 72 adjacent to the segment, or tile, 52A or 52B of the fourth annular wall 52 where the fastener 72 blends into the segment, or tile, 52A or 52B. The ribs 92 extend from the segment, or tile, 52A or 52B of the fourth annular wall 52 towards the mounting aperture 70 in the third annular wall 50 and the ribs 92 are spaced from the third annular wall 50. In addition a second washer 96 is positioned around the fastener 72 and the ribs 92 at the base of the fastener 72 and between the third annular wall 50 and the segment, or tile, 52A or 52B of the fourth annular wall 52. The second washer 96 is also located radially between the pedestals 90 on the segment, or tile, 52A or 52B and the third annular wall 50. The washer 76A and the second washer 96 provide good clamping to support the segment, or tile, 52A or 52B onto the third annular wall 50. The second washer 96 acts as a guide to focus the flow of coolant H and to prevent the flow of coolant H diffusing into the cavity between the third annular wall 52 and the fourth annular wall 50. This operates in a similar manner to the embodiment described in FIG. 7. The second washer 96 may be located radially between the third annular wall 50 and other suitable mounting support structures on the segment, or tile, 52A or 52B.

Further possible embodiments of the present invention are to use the washer shown in FIG. 3 as a substitute for the washer in the embodiment of FIGS. 9 and 10 or to use the nut and washer shown in FIG. 8 as a substitute for the nut and washer shown in FIGS. 9 and 10.

Figure 11:
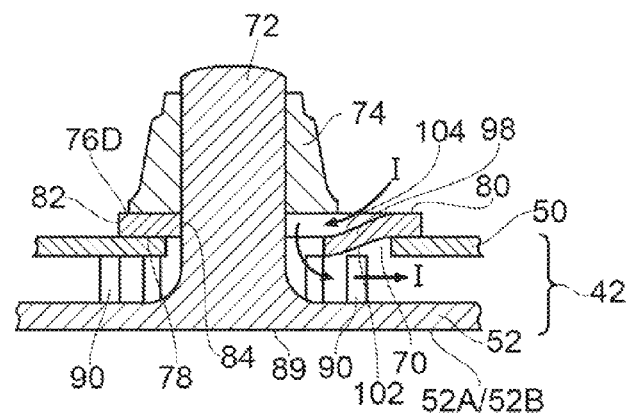
FIG. 11 is further enlarged cross-sectional view of a seventh embodiment of a combustion chamber according to the present invention.
Figure 12:
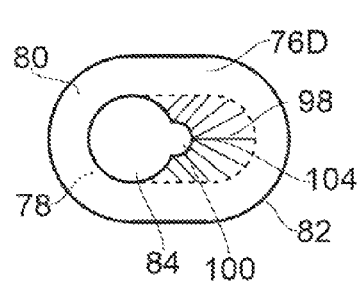
FIG. 12 is a plan view of the washer shown in FIG. 11.
Figure 13:
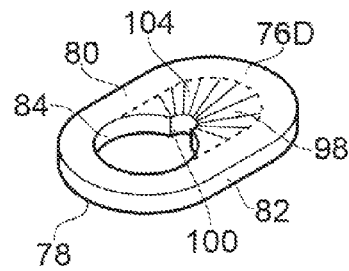
FIG. 13 is a perspective view of the washer shown in FIG. 12.

A seventh embodiment of an arrangement to mount a segment, or tile, 52A, 52B of the fourth annular wall 52 onto the third annular wall 50 of the radially outer annular wall structure 42 is shown in FIGS. 11, 12 and 13. The, or each, washer 76D has a rim 82 and a bore 84 and the washer 76D is oval in shape to correspond with an oval shaped aperture 70 in the third annular wall 50. The washer 76D has an indented portion 98 at a first side of the bore 84 and a cut out 100 extends from the bore 84 into the indented portion 98 of the washer 76D to form a keyhole shaped bore 84. A first surface 102 of the indented, or recessed, portion 98 of the washer 76D is a continuation of the first surface 78 of the washer 76D but is spaced back from the first surface 78 of the washer 76D and the abutting surface of the third annular wall 50. A second surface 104 of the indented portion 98 of the washer 76D is a continuation of the second surface 80 of the washer 76D but is spaced back from the second surface 80 of the washer 76D and the abutting a surface of the cooperating nut 74. The indented portion 98 of the washer 76D extends into the aperture 70 in the third annular wall 50 and the indented portion 98 of the washer 76D acts as a location feature for the washer 76D relative to the aperture 70. In operation the indented portion 98 of the washer 76D acts as a scoop and provides a flow of coolant I from the outside of the third annular wall 50 over the second surface 104 of the indented portion 98 of the washer 76D from the rim 82 of the washer 76D towards the bore 84 of the washer 76D. The flow of coolant I then turns to flow radially with respect to the axis of the annular combustion chamber 15 through the keyhole shaped bore 84 in the washer 76D and then through the respective mounting aperture 70 in the third annular wall 50. The flow of coolant I flows radially with respect to the axis of the annular combustion chamber 15 along the respective fastener 72 towards the base of the respective fastener 72 where the fastener 72 blends into the segment, or tile, 52A, 52B. The flow of coolant I is only to one side of the fastener 72 and does not completely surround the full circumference of the fastener 72. The flow of coolant I turns to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal. It is possible to provide ribs on the base of the fastener 72. The indented portion 98 of the washer 76D defines a groove on the second surface 80 of the washer 76D. The advantage of this arrangement is that the cut out 100 enables the flow of coolant I to flow unimpeded through the bore 84 of the washer 76D and the flow of coolant I through the indented portion, groove, 98 on the second surface 80 of the washer 76D provides some cooling of the cooperating fastener, nut, 74 and enables the cooperating fastener, nut, 74 to be made from a cheaper and less heat resistant material.

Figure 14:
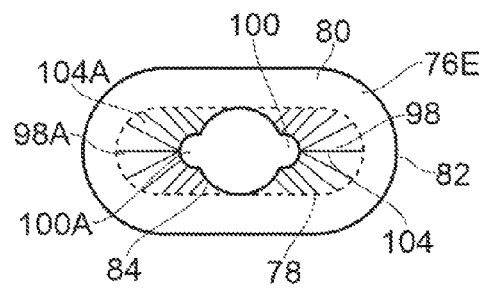
FIG. 14 is a plan view of an alternative washer for use in FIG. 11.

An eighth embodiment of an arrangement to mount a segment, or tile, 52A or 52B of the fourth annular wall 52 onto the third annular wall 50 of the radially outer annular wall structure 42 is shown in FIG. 14. This arrangement is similar to that shown in FIGS. 11 to 13 but the washer 76E has a first indented portion 98 and a second indented portion 98A provided at opposite sides of the bore 84. The bore 84 has a first cut out 100 which extends from the bore 84 into the first indented portion 98 of the washer 76E and a second cut out 100A which extends from the bore 84 into the second indented portion 98A to form a keyhole shaped bore 84. This embodiment works in a similar manner to that shown in FIGS. 11 to 13 but the provision of the second indented portion 98A and the second cut out 100A enables a flow of coolant to be provided to opposite sides of the fastener 72. It is possible to provide ribs on the base of the fastener 72. The indented portions 98 and 98A of the washer 76E define grooves on the second surface 80 of the washer 76E. The advantage of this arrangement is that the cut outs 100 and 100B enable the coolant to flow unimpeded through the bore 84 of the washer 76E and the flow of coolant through the indented portions, grooves, 98 and 98A on the second surface 80 of the washer 76E provides better cooling of the cooperating fastener, nut, 74 and enables the cooperating fastener, nut, 74 to be made from a cheaper and less heat resistant material.

Figure 15:
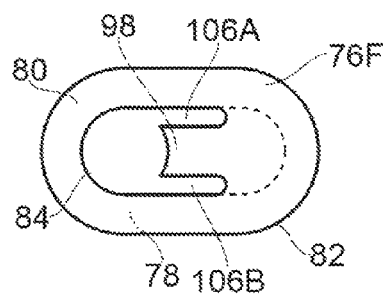
FIG. 15 is a plan view of a further washer for use in FIG. 11.

A ninth embodiment of an arrangement to mount a segment, or tile, 52A or 52B of the fourth annular wall 52 onto the third annular wall 50 of the radially outer annular wall structure 42 is shown in FIG. 15. This arrangement is similar to that shown in FIGS. 11 to 13 and the washer 76F has an indented portion 98. The washer 76F also has a first slot 106A and a second slot 106B extending tangentially from the bore 84 and provided at diametrically opposite sides of the bore 84. The slots 106A and 106B are therefore parallel to each other and the indented portion 98 is positioned between the slots 106A and 106B. This embodiment works in a similar manner to that shown in FIGS. 11 to 13. It is possible to provide ribs on the base of the fastener 72. The indented portion 98 of the washer 76F defines a groove on the second surface 80 of the washer 76D.

Figure 16:
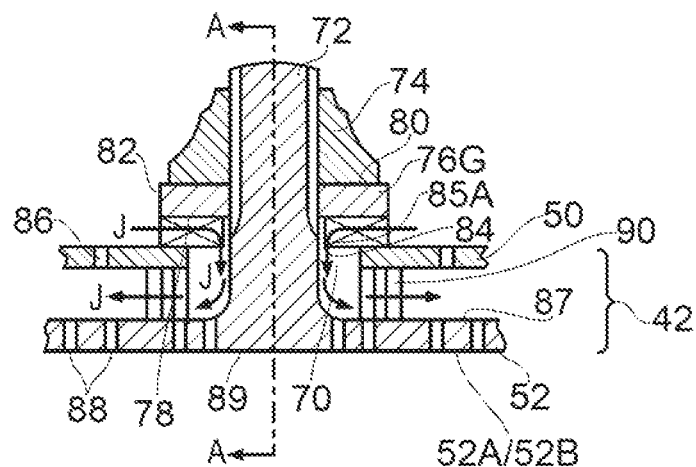
FIG. 16 is a further enlarged cross-sectional view of a tenth embodiment of a combustion chamber according to the present invention.
Figure 17:
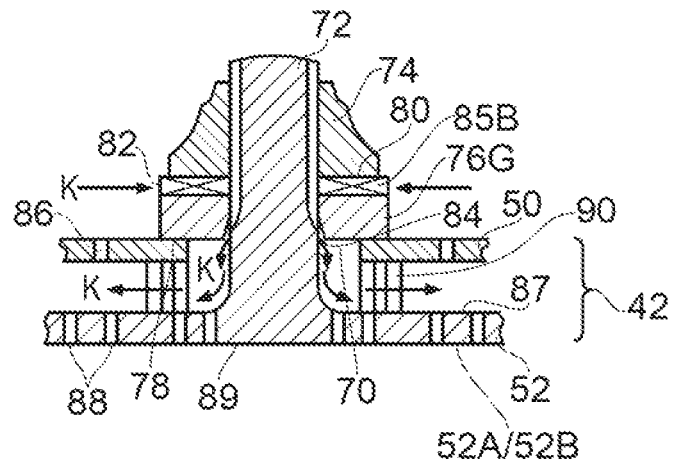
FIG. 17 is a cross-sectional view in the direction of arrows A-A in FIG. 16.
Figure 18:
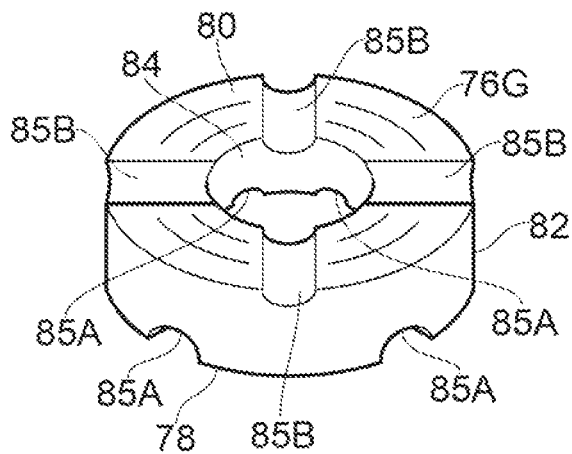
FIG. 18 is an enlarged perspective view of the washer shown in FIGS. 16 and 17.

A tenth embodiment of an arrangement to mount a segment, or tile, 52A, or 52B of the fourth annular 52 on the third annular wall 50 of the radially outer annular wall structure 42 is shown in FIGS. 16, 17 and 18. This arrangement is similar to that shown in FIG. 4 and the, or each, washer 76G has a rim 82 and a bore 84 and one or more grooves 85A extending radially from the rim 82 towards the bore 84 on the first surface 78 of the washer 76G which abuts the outer surface of the third annular wall 50 and one or more grooves 85B extending radially from the bore 84 towards the rim 82 on the second surface 80 of the washer 76G which abuts the surface of the cooperating fastener, nut, 74. The washer 76G may be circular, or disc shaped, with the bore 84 arranged to extend coaxially through the washer 76E or the washer 76E may be oval with the bore 84 arranged to extend through the washer 76. It is to be noted that the grooves 85A extend radially from the rim 82 to the bore 84 on the first surface 78 of the washer 76E and the grooves 85B extend radially from the bore 84 to the rim 82 on the second surface 80 of the washer 76E. In operation the grooves 85A and 85B in each washer 76G provide flows of coolant J and K from the outside of the third annular wall 50 through the grooves 85A and 85B from the rim 82 of the washer 76G to the bore 84 of the washer 76G. The flows of coolant J and K then turn to flow radially with respect to the axis of the annular combustion chamber 15 through the respective mounting aperture 70 in the third annular wall 50. The flow of coolant K flows axially though the bore 84 of the washer 76G and around the fastener 72 and radially with respect to the axis of the annular combustion chamber 15. The flows of coolant J and K merge and flow radially with respect to the axis of the annular combustion chamber 15 along the respective fastener 72 towards the base of the respective fastener 72 where the fastener 72 blends into the segment, or tile, 52A, 52B. The flow of coolant K and the merged flows of coolant J and K completely surround the full circumference of the fastener 72. The merged flows of coolant J and K turn to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal. In FIG. 16 in the case of a circular washer 76G and a circular mounting aperture 70 the radius of the bore of the washer 76G is less than the radius of the mounting aperture 70 and the grooves 85A on the first surface 78 of the washer 76G extend from the rim 82 of the washer 76G towards the bore 84 of the washer 76G to a radius less than the radius of the mounting aperture 70 to enable the coolant flow J and K through the mounting aperture 70. The grooves 85B on the second surface 80 of the washer 76G extend from the bore 84 of the washer 76G towards the rim 82 of the washer 76G to a radius greater than the radius of the cooperating fastener 74 to enable the coolant flow through the mounting aperture 70. The advantage of this arrangement is that the flow of coolant K through the grooves 58B on the second surface 80 of the washer 76G provides cooling of the cooperating fastener, nut, 74 and enable the cooperating fastener, nut, 74 to be made from a cheaper and less heat resistant material.

Figure 19:
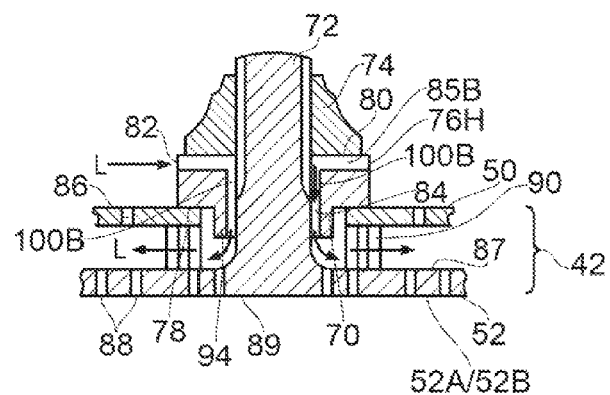
FIG. 19 is a further enlarged cross-sectional view of an eleventh embodiment of a combustion chamber according to the present invention.
Figure 20:
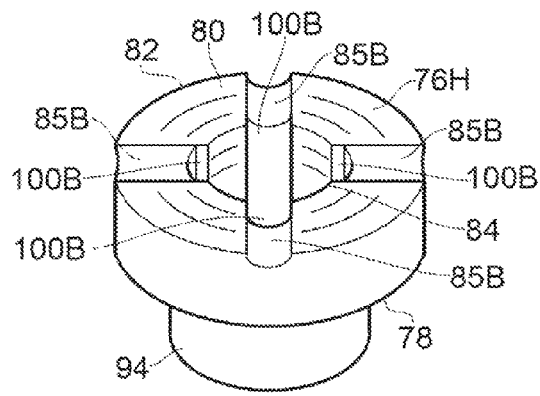
FIG. 20 is a perspective view of the washer shown in FIG. 19.

An eleventh embodiment of an arrangement to mount a segment, or tile, 52A, or 52B of the fourth annular 52 on the third annular wall 50 of the radially outer annular wall structure 42 is shown in FIGS. 19 and 20. This arrangement is similar to that shown in FIG. 7 and the, or each, washer 76H has a rim 82 and a bore 84 and one or more grooves 85B extending radially from the bore 84 towards the rim 82 on the second surface 80 of the washer 76H which abuts the surface of the cooperating fastener, nut, 74. The washer 76H may be circular, or disc shaped, with the bore 84 arranged to extend coaxially through the washer 76H or the washer 76H may be oval with the bore 84 arranged to extend through the washer 76H. It is to be noted that the grooves 85B extend radially from the bore 84 to the rim 82 on the second surface 80 of the washer 76H. The washer 76H has a sleeve 94 and the sleeve 94 is arranged coaxially with the bore 84. The inner surface of the sleeve 94 is at the same diameter as the diameter of the bore 84. The sleeve 94 of the washer 76H extends radially with respect to the axis of the annular combustion chamber 15 into the mounting aperture 70 in the third annular wall 50 and the sleeve 94 is arranged around the fastener 72. The sleeve 94 may however extend for any suitable axial length from the washer 76H. The sleeve 94 of the washer 76H acts as guide for the flow of coolant F over the fastener 72 and prevents the flow of coolant diffusing away from the base of the fastener 72 into the cavity between the third annular wall 50 and the second annular wall 52. The bore 84 of the washer 76H has a number of circumferentially spaced cut outs 100B each of which extends from the bore 84. Each cut out 100B is circumferentially aligned, and connected, with a respective one of the grooves 85B on the second surface 80 of the washer 76H. Each cut out 100B extends axially along the bore 84 of the washer 76H and along the inner surface of the sleeve 94 to form an axially extending slot along the length of the sleeve 94 of the washer 76H. In operation the grooves 85B in each washer 76H provides a flow of coolant L from the outside of the third annular wall 50 through the grooves 85B on the second surface 80 of the washer 76H from the rim 82 of the washer 76H to the bore 84 of the washer 76H. The flow of coolant L then turns to flow radially with respect to the axis of the annular combustion chamber 15 through the respective mounting aperture 70 in the third annular wall 50 and in particular the flow of coolant L turns to flow from the grooves 85B on the second surface 80 of the washer 76H and into and along the cut outs 100B in the bore 84 and inner surface of the sleeve 94 of the washer 76H. The flow of coolant L flows axially through the cut outs 100B of the bore 84 and the sleeve 94 of the washer 76H and around the fastener 72 and radially with respect to the axis of the annular combustion chamber 15. The flow of coolant L flows radially with respect to the axis of the annular combustion chamber 15 along the respective fastener 72 towards the base of the respective fastener 72 where the fastener 72 blends into the segment, or tile, 52A, 52B. The flow of coolant L completely surrounds the full circumference of the fastener 72. The flow of coolant L turns to flow circumferentially and/or axially with respect to the axis of the combustion chamber 15 when the coolant impinges upon the outer surface 87 of the segment, or tile, 52A or 52B where the fastener 72 blends into the segment, or tile, 52A or 52B and then to flow between the pedestals 90 for further heat removal. In FIG. 19 in the case of a circular washer 76H and a circular mounting aperture 70 the radius of the bore of the washer 76H is less than the radius of the mounting aperture 70 and the grooves 85B on the second surface 80 of the washer 76H extend from the bore 84 of the washer 76H towards the rim 82 of the washer 76H to a radius greater than the radius of the cooperating fastener 74 to enable the coolant to flow through the mounting aperture 70. The advantage of this arrangement is that the cut outs 100B enable the flow of coolant L to flow unimpeded through the bore 84 and sleeve 94 of the washer 76H and the flow of coolant L through the grooves 58B on the second surface 80 of the washer 76H provides cooling of the cooperating fastener, nut, 74 and enable the cooperating fastener, nut, 74 to be made from a cheaper and less heat resistant material.

In another embodiment the washer 76I, as shown in FIG. 22, is similar to that shown in FIGS. 19 and 20 but the bore of the washer and the sleeve of the washer are not provided with the cut outs. This would provide cooling of the cooperating fastener, but may be subject to manufacturing tolerances of the washer and sleeve and the fastener reducing or blocking the flow of coolant through the bore of the washer.

The washers in any of these embodiments may be circular, oval or any suitable shape in order to cooperate with the shape of the corresponding aperture in the first or third annular wall.

The embodiments previously described may equally well be used to mount the segments, or tiles, 48A and 48B of the second annular wall 48 to the first annular wall 46 and may be used to mount segments, or tiles, provided on an upstream end wall 44.

Alternatively, the fasteners 60 and 72 on the second and fourth annular walls 48 and 52 may comprise bosses which have threaded recesses and which are cast integrally with the segments, or tiles, 48A, 48B, 52A and 52B and the cooperating fasteners 62 and 74 may be bolts. In any of these embodiments with ribs on the fastener, the ribs would be provided on the, or each, boss and in any of these embodiments with grooves on the cooperating fastener the grooves would be provided on a surface of the bolt abutting the second surface of the washer.

Although the present invention has been described with reference to the use of ribs on the base of the fasteners it may be equally possible to provide other equivalent features such as a plurality of pedestals or other types of projections. The pedestals may be arranged to extend laterally, radially with respect to the axis of the fastener, from the fastener. The pedestals may be arranged in rows and there may be several rows of pedestals spaced apart longitudinally along the fastener and radially with respect to the axis of the combustion chamber. The pedestals are integral with the fasteners.

The projections, ribs or pedestals, may be integral with the fastener. The fastener may be integral with the segments, or tiles. The segments, or tiles, may be formed by casting molten metal or may be formed from powder metal by selective laser sintering or using a fused powder bed.

Thus the present invention provides a combustion chamber comprising an outer wall and an inner wall spaced from the outer wall, the outer wall having at least one mounting aperture extending there-through, the inner wall having at least one fastener extending there-from, the at least one fastener on the inner wall extending through the mounting aperture in the outer wall, at least one cooperating fastener locating on the fastener extending through the mounting aperture and at least one washer positioned between the outer wall and the cooperating fastener, the at least one washer having a first surface abutting an outer surface of the outer wall and a second surface abutting a surface of the cooperating fastener, the at least one washer having a rim and a bore, the at least one washer having at least one passage extending there-through from the rim to the bore and/or the at least one washer having at least one groove extending from the rim towards the bore on the first surface and/or the at least one washer having at least one groove extending from the bore towards the rim on the second surface and/or the surface of the cooperating fastener abutting the second surface of the washer having at least one groove extending towards the bore of the washer whereby a flow of coolant is provided to flow through the mounting aperture and around the fastener. The at least one washer may have at least one passage extending there-through from the rim to the bore and at least one groove extending from the rim towards the bore on the first surface and at least one groove extending from the bore towards the rim on the second surface. The at least one washer may have at least one passage extending there-through from the rim to the bore and at least one groove extending from the rim towards the bore on the first surface. The at least one washer may have at least one groove extending from the rim towards the bore on the first surface and at least one groove extending from the bore towards the rim on the second surface. The washer at least partially defining at least one passage extending between the rim and the bore of the washer whereby a flow of coolant is provided to flow through the mounting aperture and around the at least one fastener.

The inner wall may be a radially inner wall and the outer wall may be a radially outer wall of an outer wall of an annular combustion chamber. The inner wall be a radially outer wall and the outer wall may be radially inner wall of an inner wall of an annular combustion chamber. Alternatively the inner wall may be a radially inner wall and the outer wall may be a radially outer wall of a tubular combustion chamber. The inner wall may be a downstream wall and the outer wall may be an upstream wall of an upstream end wall of annular combustion chamber or a tubular combustion chamber.

Based on a temperature of 2600K for the hotter side of the inner wall it has been calculated that the use of the embodiment in FIG. 3 would result in a 30% reduction of the temperature at the base of the threaded stud compared to the conventional arrangement. Similarly it has been calculated that the use of the embodiment in FIGS. 5 and 6 would result in greater than 35% reduction of the temperature at the base of the threaded stud compared to the conventional arrangement. Additionally it has been calculated that the use of the embodiment in FIG. 7 would result in greater than 40% reduction of the temperature at the base of the threaded stud compared to the conventional arrangement.

In all of the embodiments of the present invention a function of the washer positioned between the outer surface of the outer wall and the nut on the threaded stud is to support the clamping load holding the tile of the inner wall onto the outer wall.

The advantage of the present invention is that it provides enhanced cooling of the, or each, fastener extending from a combustion chamber wall segment, or tile. The enhanced cooling of the, or each, fastener extending from the chamber wall segment, or tile, increases the service life of the combustion chamber segment, or tile, by reducing the temperature to which the fastener, or fasteners, is/are exposed and by reducing thermally induced stresses in the fastener or fasteners extending from the segment, or tile. The enhanced cooling is provided by uniform cooling of the, or each, fastener extending from the combustion chamber segment, or tile, at the cooler side of the segment, or tile. In addition because the enhanced cooling of the, or each, fastener is provided by cooling the cooler side of the segment, or tile, there is no requirement to provide cooling apertures through the segments, or tiles, in the region of the fasteners.

The invention claimed is:

1. A combustion chamber comprising,
an outer wall and an inner wall spaced from the outer wall,
the outer wall having at least one mounting aperture extending there-through,
the inner wall having at least one fastener extending there-from,
the at east one fastener on the inner wall extending through a corresponding mounting aperture in the outer wall,
a cooperating fastener locating on the at least one fastener extending through the corresponding mounting aperture and a washer positioned on the at least one fastener between the outer wall and the cooperating fastener,
the at least one fastener extending entirely through the washer,
the washer having a first surface abutting an outer surface of the outer wall and a second surface abutting a surface of the cooperating fastener,
the washer having a rim and a bore, and
(i) the washer having at least one passage extending there-through from the rim to the bore, (ii) the washer having at least one groove extending from the rim towards the bore on the first surface, (iii) the washer having at least one groove extending from the bore towards the rim on the second surface, or (iv) the surface of the cooperating fastener abutting the second surface of the washer having at least one groove extending towards the bore of the washer,
whereby, in use, a flow of coolant is provided to flow through the mounting aperture and around the at least one fastener,
wherein the fastener has an outer surface and a plurality of projections extending radially outward from the outer surface of the fastener with respect to a centerline of the fastener, and the projections are arranged at an end of the fastener adjacent to the inner wall.

2. The combustion chamber as claimed in claim 1, wherein the washer has a sleeve, the sleeve extending into the mounting aperture in the outer wall and the sleeve being arranged around the fastener to guide the flow of coolant around the fastener.

3. The combustion chamber as claimed in claim 1, wherein
the projections are ribs extending radially outward from the outer surface of the fastener with respect to the centerline of the fastener, and
the ribs extend from the inner wall towards the mounting aperture and the ribs are spaced from the outer wall.

4. The combustion chamber as claimed in claim 3, wherein the ribs extend from the inner wall along the fastener at least partially into the mounting aperture.

5. The combustion chamber as claimed in claim 4, wherein
the washer has a sleeve spaced from the bore, the sleeve extending into the mounting aperture in the outer wall and the sleeve being arranged around the fastener to guide the flow of coolant around the fastener and over the ribs.

6. The combustion chamber as claimed in claim 1 wherein
the at least one mounting aperture is oval in shape,
the washer is oval in shape,
a portion of the first surface of the washer is spaced from the remainder of the first surface,
a portion of the second surface of the washer is spaced from the remainder of the second surface to form an indent, and
the indent extending into the mounting aperture.

7. The combustion chamber as claimed in claim 1 wherein a second washer is positioned between the inner wall and the outer wall and the second washer is arranged around the fastener.

8. The combustion chamber as claimed in claim 7 wherein the second washer is clamped between the outer wall and pedestals on the inner wall.

9. The combustion chamber as claimed in claim 1, wherein
a second washer is positioned between the inner wall and the outer wall and the washer being arranged around the fastener, the second washer being arranged around the fastener to guide the flow of coolant around the fastener and over the projections.

10. The combustion chamber as claimed in claim 1, wherein the projections are pedestals, the pedestals being arranged in rows and the rows of pedestals being spaced apart longitudinally with respect to the fastener.

11. A combustion chamber comprising
an outer wall and an inner wall spaced from the outer wall,
the outer wall having at least one mounting aperture extending there-through,
the inner wall having at least one fastener extending there-from,
the at least one fastener on the inner wall extending through a corresponding mounting aperture in the outer wall,
a cooperating fastener locating on the at least one fastener extending through the corresponding mounting aperture and a washer positioned on the at least one fastener between the outer wall and the cooperating fastener,
the washer having a sleeve,
the sleeve extending into the mounting aperture in the outer wall,
the washer having a first surface abutting an outer surface of the outer wall and a second surface abutting a surface of the cooperating fastener,
the washer having a rim and a bore,
the washer having at least one passage,
the at least one passage being selected from the group consisting of at least one passage extending through the washer from the rim to the bore, at least one groove extending from the rim towards the bore on the first surface of the washer and at least one groove extending from the bore towards the rim on the second surface of the washer,
whereby, in use, a flow of coolant is provided to flow through the mounting aperture and around the at least one fastener,
the sleeve being arranged around the fastener to guide the flow of coolant around the fastener.

12. The combustion chamber as claimed in claim 11, wherein the washer is circular or oval.

13. The combustion chamber as claimed in claim 11, wherein the inner wall comprising comprises a plurality of segments.

14. The combustion chamber as claimed in claim 11, wherein the outer wall having has a plurality of impingement apertures extending there-through and the inner wall having has a plurality of effusion apertures extending there-through.

15. The combustion chamber as claimed in claim 11, wherein the inner wall is a radially inner wall and the outer wall is a radially outer wall of an outer wall of an annular combustion chamber.

16. The combustion chamber as claimed in claim 11, wherein the inner wall is a radially outer wall and the outer wall is a radially inner wall of an inner wall of an annular combustion chamber.

17. The combustion chamber as claimed in claim 11, wherein the inner wall is a radially inner wall and the outer wall is a radially outer wall of a tubular combustion chamber.

18. The combustion chamber as claimed in claim 11, wherein the inner wall is a downstream wall and the outer wall is an upstream wall of an upstream end wall of an annular combustion chamber or a tubular combustion chamber.

19. The combustion chamber as claimed in claim 11, wherein
the outer wall has a plurality of mounting apertures extending there-through,
the inner wall having a plurality of fasteners extending there-from,
each fastener on the inner wall extending through a corresponding mounting aperture in the outer wall,
a cooperating fastener locating on each fastener extending through the corresponding mounting aperture and a washer positioned on each fastener between the outer wall and the cooperating fastener,
each washer having a sleeve,
each sleeve extending into the corresponding mounting aperture in the outer wall,
each washer having a first surface abutting an outer surface of the outer wall and a second surface abutting a surface of the cooperating fastener, each washer having a rim and a bore,
each washer having at least one passage,
the at least one passage being selected from the group consisting of at least one passage extending through the washer from the rim to the bore, at least one groove extending from the rim towards the bore on the first surface of the washer and at least one groove extending from the bore towards the rim on the second surface of the washer,
whereby, in use, a flow of coolant is provided to flow through each mounting aperture and around each fastener,
each sleeve being arranged around the fastener to guide the flow of coolant around the fastener.

20. The combustion chamber as claimed in claim 11, wherein
the fastener has a plurality of ribs extending radially outward from an outer surface of the fastener with respect to a centerline of the fastener, and
the ribs are arranged at an end of the fastener adjacent to the inner wall, the ribs extending from the inner wall at least partially into the mounting aperture and the ribs being spaced from the outer wall, the sleeve being spaced from the bore and the sleeve being arranged around the fastener to guide the flow of coolant around the fastener and over the ribs.

21. A combustion chamber comprising
an outer wall and an inner wall spaced from the outer wall,
the outer wall having at least one mounting aperture extending there-through,
the inner wall having at least one fastener extending there-from,
the at least one fastener on the inner wall extending through a corresponding mounting aperture in the outer wall,
a cooperating fastener locating on the at least one fastener extending through the corresponding mounting aperture and a washer positioned on the fastener between the outer wall and the cooperating fastener,
the washer having a sleeve,
the sleeve extending into the mounting aperture in the outer wall,
the washer having a first surface abutting an outer surface of the outer wall and a second surface abutting a surface of the cooperating fastener,
the washer having a rim and a bore,
the surface of the cooperating fastener abutting the second surface of the washer having at least one groove extending towards the bore of the washer whereby, in use, a flow of coolant is provided to flow through the mounting aperture and around the at least one fastener, the sleeve being arranged around the fastener to guide the flow of coolant around the fastener.

22. The combustion chamber as claimed in claim 21, wherein
the fastener has a plurality of ribs extending radially outward from an outer surface of the fastener with respect to a centerline of the fastener, and
the ribs are arranged at an end of the fastener adjacent to the inner wall, the ribs extending from the inner wall at least partially into the mounting aperture and the ribs being spaced from the outer wall, the sleeve being spaced from the bore and the sleeve being arranged around the fastener to guide the flow of coolant around the fastener and over the ribs.

\* \* \* \* \*